Dec. 23, 1952   A. L. BERGSTROM   2,622,944
SEALED BEARING UNIT
Filed Oct. 27, 1950
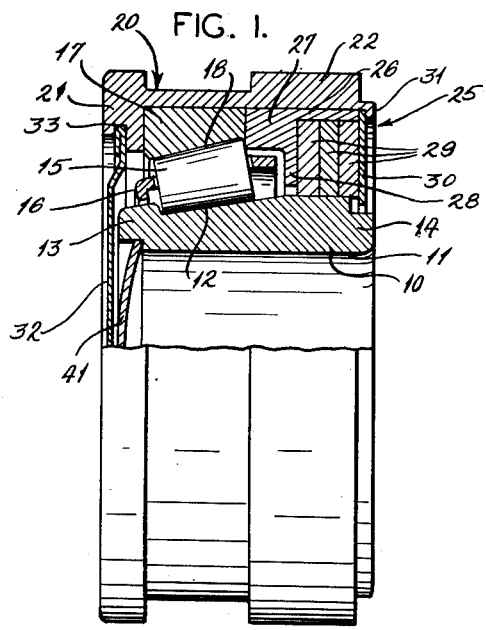
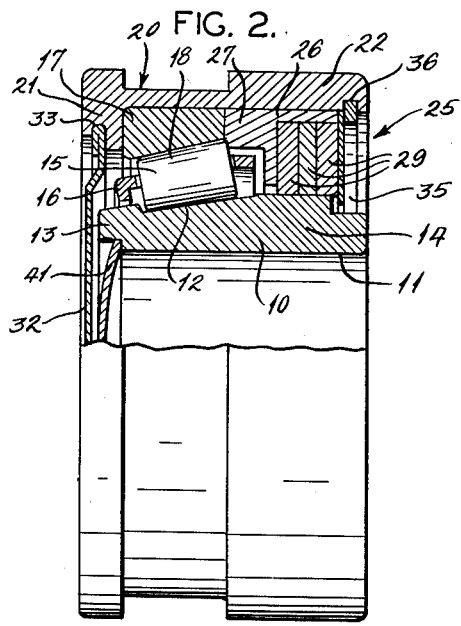
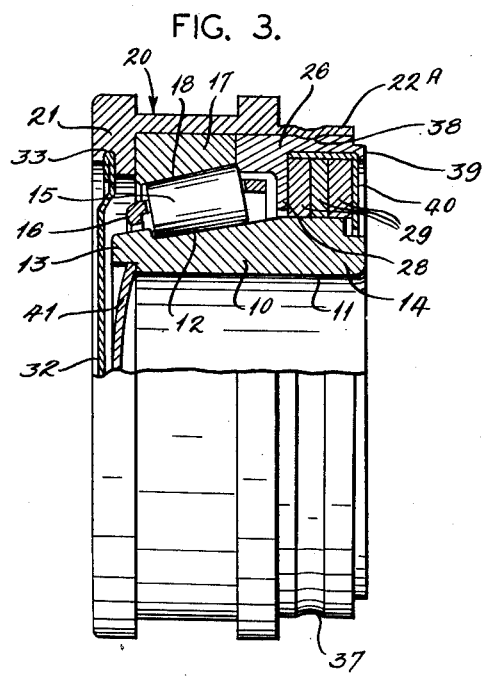
INVENTOR:
ALBERT L. BERGSTROM
By Carr & Carr & Gravely
ATTORNEYS.

Patented Dec. 23, 1952

2,622,944

UNITED STATES PATENT OFFICE 2,622,944

SEALED BEARING UNIT

Albert L. Bergstrom, Canton, Ohio, assignor to The Timken Roller Bearing Company, Canton, Ohio, a corporation of Ohio Application October 27, 1950, Serial No. 192,486

5 Claims. (Cl. 308—187.2)

This invention relates to improvements in sealed bearing units, and has as an object the provision in a bearing unit of a combination bearing thrust rib and mounting means for a bearing seal which considerably simplifies the bearing construction and the assembly of the bearing parts.

The invention consists in an inner race member having a bearing guide rib at one end and an extension at the opposite end, an outer race member supported in an outer housing and located between a housing thrust rib and a ring member provided with a thrust rib and adapted for mounting a bearing seal. The invention further consists in the assembly of the above bearing unit wherein the sealing means and the mounting ring therefor are detachably assembled in the unit.

The invention additionally consists in the construction and arrangement of parts of the bearing unit hereinafter described and claimed.

In the drawings,

Fig. 1 is a partly sectioned elevational view of a bearing assembly constructed in accordance with my invention.

Fig. 2 is a partly sectioned elevational view of a modified bearing assembly, and Fig. 3 is a partly sectioned elevational view of a further modified bearing construction.

Referring to the several views of the drawing, the present sealed bearing unit comprises an inner race or cone member 10 having a central bore 11 and formed on its outer surface with a raceway 12 between an end rib 13 and a cone extension 14. Suitable tapered roller bearings 15 assembled in a bearing cage 16 are adapted to move on the cone raceway 12 and are enclosed by an outer race or cup member 17 having a cooperating raceway 18. The cup member 17 is supported in a cup housing 20 against a housing end rib 21. The opposite end portion of housing 20 forms a housing extension 22.

The above described bearing assembly includes a bearing seal unit 25 which consists in a ring member 26 having an inner thrust rib 27 thereon for abutment with the cup member 17 in the manner shown. Ring member 26 is provided with a radially inwardly extending portion 28 which provides a seat for receiving a plurality of suitable sealing elements 29. These sealing elements 29 may be of the lubricant impregnated type and are enclosed within the ring seat by means of an outer flat annular washer 30. In the bearing unit of Fig. 1, the lubricant impregnated elements 29 and the ring 26 are permanently retained in assembly by means of the outer inturned flange portion 31 which is formed as an integral part of the cup housing extension 22.

The bearing unit is provided opposite the end portion containing the lubricant retaining seal elements 29 with a closure diaphragm, disk or the like 32 which is peripherally engaged in a recess 33 provided in a portion of the end rib 21 of the cup housing 20.

A modification of the sealed bearing unit is disclosed in connection with Fig. 2 in which the sealing unit 25 is adapted to be removably retained in the cup housing extension 22 through the provision of an annular snap-type ring 35 suitably engaged in an undercut annular slot 36 formed at the inner end surface of the cup housing extension 22.

A still further modification of the present invention is disclosed in connection with Fig. 3. In this latter view, the ring member 26 is adapted to be permanently engaged in the cup house extension 22 by means of an inwardly directed rolled bead 37 which engages in a complementary bead receiving channel 38 formed in the outer surface of the ring 26. The outer end of ring 26 is provided with a radially inwardly directed flange or lip 39 which is adapted to engage with and retain the lubricant impregnated elements 29. In this modification, the elements 29 are suitably independently retained in a frame 40 which, in turn, is received in the ring member 26 adjacent the seat 28 thereof.

The bearing herein shown and described is a single row, prelubricated unit which has utility for supporting the end of a shaft pressed into the cone bore 11. The rolling element cavity of this bearing is completely enclosed by the lubricant retaining elements 29, the closure disk 32 and by a cone disk 41 which is snap fitted at the outer end of the cone bore 11. The bearing unit is arranged so that the roller end thrust is counteracted by the rib 27 on the ring 26 which also receives the sealing elements 29. The unit assembly can be maintained either permanently or not, as shown.

The present invention has been described in connection with a preferred bearing unit construction and also in connection with certain preferred modifications thereof, but it should be understood that additional modifications and rearrangements of the bearing parts are to be included within the spirit and scope of the appended claims.

What I claim is:

1. A bearing unit comprising a cone member providing a raceway and having a rib at one end thereof, rollers in said cone raceway guided by said rib, a cup member enclosing said rollers and providing a raceway therefor, bearing closure means adjacent said cone and cup members, said closure means providing a thrust member for said rollers, housing means enclosing said cup member, and holding means adjacent one end of said housing for retaining said closure means in assembly with said thrust member in position to resist thrust of said rollers in one direction.

2. A bearing unit comprising a cone member providing a raceway and having a rib at one end thereof, rollers in said cone raceway guided by said rib, a cup member providing a raceway for said rollers, a cup housing having a rib at one end abutting said cup member, and means for closing the opposite end of said cup housing including a ring and sealing means in said ring, said ring having a thrust rib abutting said rollers and an adjacent seat to receive said sealing means.

3. A bearing unit comprising a cone having an end rib and a raceway thereadjacent, rollers in said raceway guided by said rib, a cup having a roller raceway, a cup housing formed with an end rib for said cup, said rib being radially opposite said cone end rib, said cup housing and cone extending beyond said rollers opposite to said ribs, a ring member in said housing extension providing a roller thrust rib, and bearing sealing means in said ring member cooperating with said cone extension.

4. A bearing unit comprising a cone having an end rib and an adjacent raceway, rollers in said cone raceway guided by said cone rib, a cup having a roller raceway, a cup housing provided with a rib located radially opposite said cone rib, said cone and cup housing having extension portions opposite the respective ribs thereof, a ring member removably locked in said housing extension, said ring member having a thrust rib abutting said cup and engaged by said rollers, said ring member also having a seat outwardly of said thrust rib, and sealing means disposed in said ring member on said seat in cooperating relation with said cone extension.

5. A bearing unit comprising a cone having an end rib and an adjacent raceway, rollers in said cone raceway guided by said cone rib, a cup having a roller raceway, a cup housing provided with a rib located radially opposite said cone rib, said cone and cup housing having extension portions opposite the respective ribs thereof, a ring member removably locked in said housing extension, said ring member having a thrust rib abutting said cup, and said cup housing extension being formed with an inturned flange for securing said ring member therein, and sealing means disposed in said ring member in cooperating relation with said cone extension.

ALBERT L. BERGSTROM.

REFERENCES CITED

The following references are of record in the file of this patent:

UNITED STATES PATENTS

| Number | Name | Date |
|--------|------|------|
| 1,437,833 | Buckwalter | Dec. 5, 1922 |
| 1,995,838 | Buckwalter | Mar. 26, 1935 |
| 2,003,605 | Oelkers | June 4, 1935 |
| 2,124,526 | Goldsworthy | July 26, 1938 |
| 2,141,122 | Boden | Dec. 20, 1938 |